United States Patent [19]

Fujimori

[11] Patent Number: 5,517,892
[45] Date of Patent: May 21, 1996

[54] ELECTONIC MUSICAL INSTRUMENT HAVING MEMORY FOR STORING TONE WAVEFORM AND ITS FILE NAME

[75] Inventor: Junichi Fujimori, Hamamatsu, Japan

[73] Assignee: Yamaha Corporation, Japan

[21] Appl. No.: 466,804

[22] Filed: Jun. 6, 1995

Related U.S. Application Data

[63] Continuation of Ser. No. 164,699, Dec. 6, 1993, abandoned.

[30] Foreign Application Priority Data

Dec. 9, 1992 [JP] Japan .................. 4-329715
Oct. 18, 1993 [JP] Japan .................. 5-260085

[51] Int. Cl.⁶ ........................ G09B 15/02; G10G 3/04
[52] U.S. Cl. ........................ 84/462; 84/477 R
[58] Field of Search ................. 84/604–607, 115, 84/453, 454, 462, 477 R, 478

[56] References Cited

U.S. PATENT DOCUMENTS

| | | | |
|---|---|---|---|
| 4,479,416 | 10/1984 | Clague | 84/462 |
| 4,573,390 | 3/1986 | Saito | 84/115 |
| 4,958,552 | 9/1990 | Minamitaka et al. | 84/477 R X |
| 5,278,347 | 1/1994 | Konishi | 84/477 R X |
| 5,287,789 | 2/1994 | Zimmerman | 84/477 R |

OTHER PUBLICATIONS

"Computer Musical Journal" vol. 3, No. 4, Issue 12, dated Dec. 1979.

*Primary Examiner*—Stanley J. Witkowski
*Attorney, Agent, or Firm*—Graham & James

[57] ABSTRACT

In order to use a plenty of waveform data, representing sampling waveforms of sounds produced from musical instruments, an electronic musical instrument provides a hard disk unit. Herein, musical tone information containing the waveform data is registered into the hard disk unit in the form of a file using a specific file name. When registering the file into the hard disk unit, a string of characters representing a musical property of the musical tone information are automatically created and are used as a part of the file name. Each file name incorporates an identifier made of one or more characters. When a new file name, which is automatically created and is assigned to a new file to be newly registered into the hard disk unit, coincides with the existing file name of the file which has been already registered in the hard disk unit, a new identifier is automatically created and is incorporated into the new file name. Thus, the file representing the musical tone information can be smoothly registered in the hard disk unit with the file name automatically created.

21 Claims, 7 Drawing Sheets

FIG.1

FIG.2
(MAIN ROUTINE)

FIG.3
(ROUTINE OF SAMPLING PROCESS)

ELECTONIC MUSICAL INSTRUMENT HAVING MEMORY FOR STORING TONE WAVEFORM AND ITS FILE NAME

This is a continuation of application Ser. No. 08/164,699 filed on Dec. 6, 1993 and now abandoned.

BACKGROUND OF THE INVENTION

1. Field of the Invention

The present invention relates to an electronic musical instrument which synthesizes musical tones on the basis of musical tone information representing waveform data, rhythm data, performance data and the like of non-electronic musical instruments such as the piano, violin and the like.

2. Prior Art

Recently, in the field of the electronic musical instruments, several kinds of recording and reproducing apparatuses are developed and are brought into practice. At first, sounds produced from the musical instruments such as the piano are subjected to sampling operation, thus obtaining sampling data which are eventually stored in memories. Then, the sampling data are read out from the memories and are used to reproduce the sounds of the musical instruments. The above-mentioned recording and reproducing apparatus is called a "sampler". In a waveform recording mode, a microphone converts the sounds of the musical instruments into electric signals, which are sequentially supplied to an analog-to-digital converter (i.e., A/D converter). The A/D converter converts those electric signals into waveform data by every sampling period. Then, the waveform data are stored in a random-access memory (i.e., RAM) and the like.

When recording the sounds of the piano and the like, a so-called "multi-sampling technique" is used. According to the multi-sampling technique the whole frequency range to which all of the sounds produced from the piano belongs is divided into several sectors (each denoted to as a tone area); and then, the waveform is sampled with respect to each of the tone areas. Herein, one tone area corresponds to three keys of the piano, for example. This multi-sampling technique is effective to reproduce the tone color unique to the piano with accuracy. On the other hand, when reproducing the sounds whose waveforms are sampled as described above, the waveform data belonging to the tone area corresponding to a key-depression event is read out from the memory; and then, the sound corresponding to the read waveform data is produced by use of the tone pitch designated by the keycode corresponding to the key-depression event.

In the above-mentioned recording and reproducing apparatus, the waveform data which are obtained by performing the sampling operations are saved and stored in an external storage unit such as a hard disk unit. When saving the waveform data, the waveform data are transferred to and are registered in accordance with a file name (or a file number) which is designated by a user. As the file name to be assigned to the waveform data, it is demanded to use the name which represents the contents of the waveform data to be registered. However, when registering the waveform data which are obtained by the aforementioned multi-sampling technique, a plenty of file names assigned to a plenty of waveform data whose properties are similar to each other should be provided and are inputted into the storage unit, which requires complicated operations for the user.

Moreover, when assisting the file name to the waveform data, there is a possibility in that the file name previously used is assigned to the waveform data to be currently registered by mistake. In such case, new waveform data are overwritten on the file in which another waveform data have been already written, resulting that those waveform data are destroyed by the new waveform data. Further, the file name must be given with some meaning representing the contents of the waveform data in order to presume the contents of the waveform data from the file name. If the file name is not determined in connection with the contents of the waveform data, it is difficult for the user to search out the desired file.

As a result, the conventional recording and reproducing apparatus to be applied to the electronic musical instrument is troublesome because it requires the complicated operations for the users. For example, when registering the sampling waveform data, the user should input each of the file names manually, while each of the file names should be given with the meaning which is useful to discriminate the contents of the files.

SUMMARY OF THE INVENTION

Accordingly, it is a primary object of the present invention to provide an electronic musical instrument which is capable of automatically creating a character string representing the property of the musical tone information such as the sampling waveform data.

According to a fundamental configuration of the present invention, an electronic musical instrument comprising: a storage device for storing musical tone information which is provided to produce a musical tone, an analyzing portion for analyzing the musical tone information so as to obtain its musical property, a character creating portion for automatically creating a string of characters representing the musical property of the musical tone information, and a display portion for visually displaying a string of characters in connection with the musical tone information. The above-mentioned string of characters are added to the musical tone information.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

[A] Configuration of Embodiment

Figure 1:
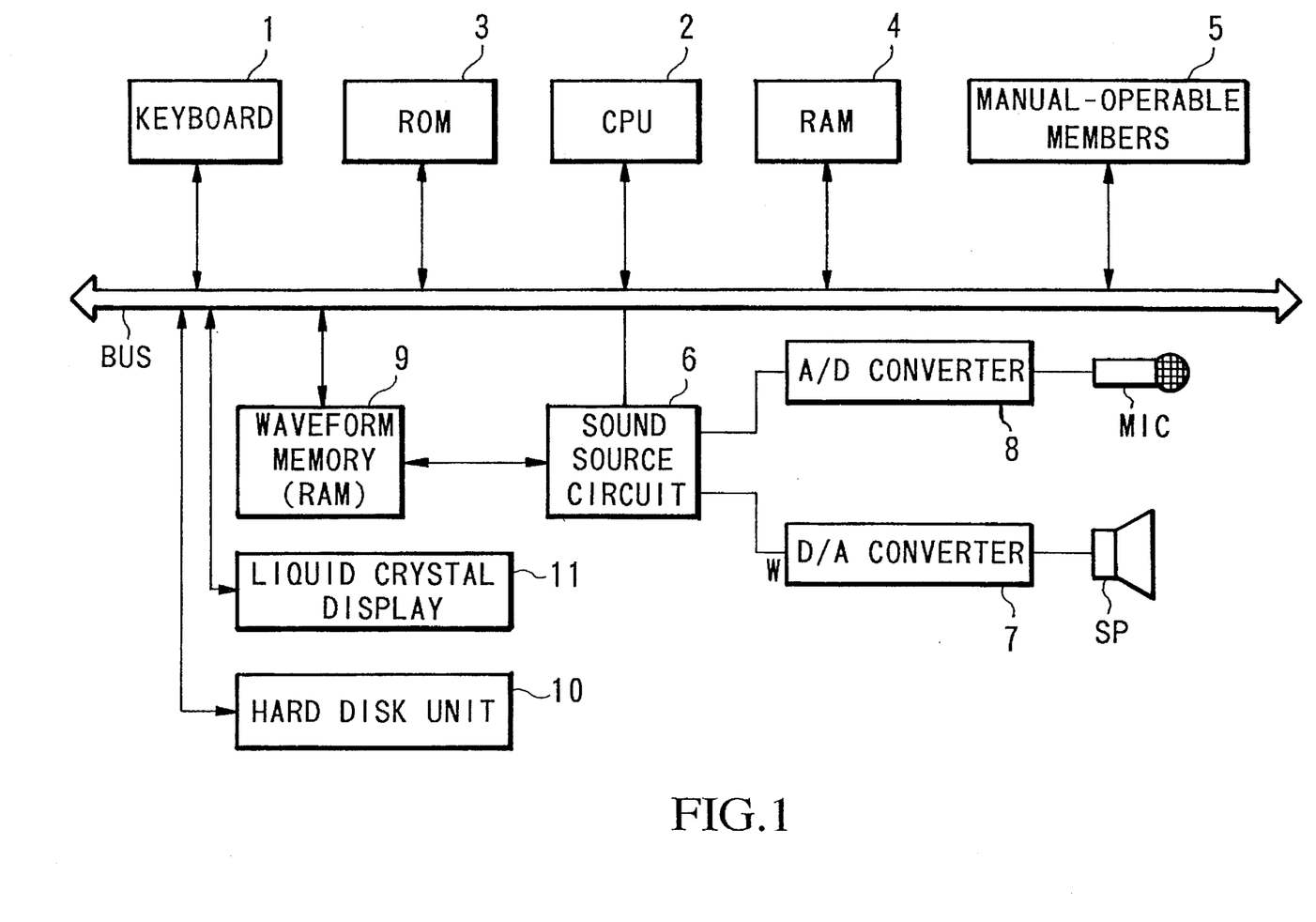
FIG. 1 is a block diagram showing an electronic configuration of an electronic musical instrument according to an embodiment of the present invention.

FIG. 1 is a block diagram showing the electronic musical instrument according to an embodiment of the present invention. In FIG. 1, a numeral 1 denotes a keyboard unit, which is operated by a performer when producing the musical tones by use of the sampling waveform data. This keyboard unit 1 detects a key-depression velocity as well as a key-depression event or a key-release event with respect to a keyboard-performing operation so as to correspondingly produce a keycode KC and a key-on signal KON or a key-off signal KOF. A numeral 2 denotes a central processing unit (i.e., CPU) which controls several portions of the sampler. Incidentally, operations of the CPU 2 will be described later. A numeral 3 denotes a read-only memory (i.e., ROM). The ROM 3 stores several kinds of control programs executed by the CPU 1 as well as several kinds of data in the form of tables. Furthermore, the ROM 3 also stores pattern data, the contents of which will be described later.

A numeral 4 denotes a random-access memory (i.e., RAM) which temporarily stores results of operations, values of registers and the like. Incidentally, the waveform data transferred from a waveform memory 9 are written into a specific area of the RAM 4, so that the waveform data are subjected to tone-color editing processes. A numeral 5 denotes manual-operable members (e.g., switches and controls) which are arranged on a panel face of the sampler. Each of the manual-operable members can produce an operation signal corresponding to an manual operation applied thereto. As the manual-operable members, there are provided a start switch, a stop switch, a mode switch and tone-color Selecting switches. The start switch is provided to start the waveform sampling operation, while the stop switch is provided to stop it. The mode switch is provided to designate the aforementioned tone-color editing process.

A numeral 6 denotes a sound source circuit which is configured by a musical tone synthesizing portion and a waveform sampling portion. The musical tone synthesizing portion is configured in accordance with the known waveform-memory-read-out system. Herein, a musical-tone synthesizing operation is performed on the basis of the waveform data which are sequentially read from the waveform memory 9 in response to several kinds of signals given from the CPU 3 through a bus, thus forming digital musical tone signals W. The digital musical tone signals W are converted into analog signals by a digital-to-analog converter (i.e., D/A converter) 7. Thereafter, the musical tones corresponding to the analog signals are produced from a speaker SP.

Meanwhile, output data of an analog-to-digital converter (i.e., A/D converter) 8 corresponds to the waveform data, representing the sounds picked up by a microphone, which are obtained by performing the aforementioned sampling operations. The waveform data given from the A/D converter 8 are supplied to the waveform sampling portion provided in the sound source circuit 6; and then, those waveform data are written into the waveform memory 9. The waveform sampling portion provides a plurality of read/write channels which are activated in a time-division manner. When reproducing the waveform, the waveform data corresponding to the keyboard-performing operation applied to the keyboard unit 1 by the performer are read from the waveform memory 9, so that those waveform data are supplied to the musical tone synthesizing portion. A numeral 10 denotes a hard-disk unit which is designed to store the waveform data in the form of the files. Incidentally, when carrying out a file registration, a registration file name is automatically created under certain operations, the contents of which will be described later. A numeral 11 denotes a liquid crystal display using a liquid crystal panel on which several kinds of data given from the CPU 2 are visually displayed.

[B] Operations of Embodiment

Next, operations of the electronic musical instrument having the above-mentioned configuration will be described by referring to FIGS. 2 to 6.

(1) Main Routine

Figure 2:
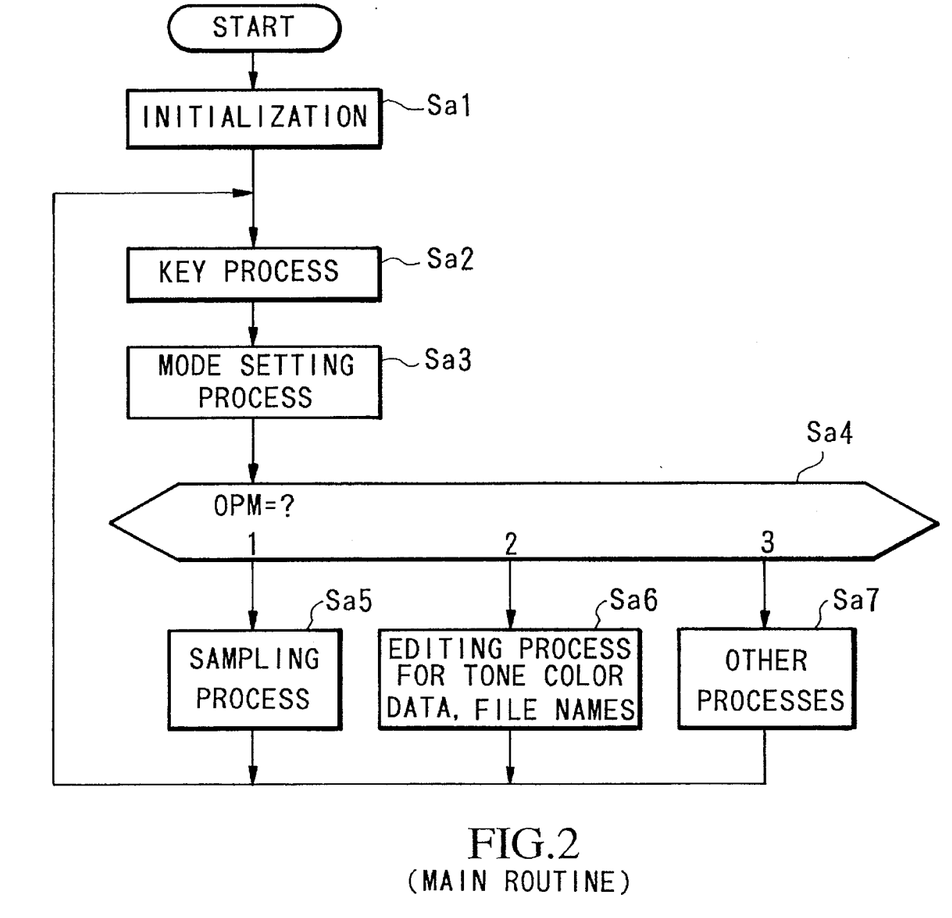
FIG. 2 is a flowchart showing a main routine of programs which are carried out by the electronic musical instrument.

When the power is applied to the sampler, which is designed in accordance with the present invention, the CPU 2 reads out the control programs stored in the ROM 3 so as to start the processing of the main routine as shown in FIG. 2. Thus, the processing executed by the CPU 2 proceeds to step Sa1. In step Sa1, an initialization process is carried out on several kinds of registers provided in the electronic musical instrument, while the aforementioned manual-operable members 5 are respectively set in initial states. Then, the Processing of the CPU 2 proceeds to step Sa2.

In step Sa2, a key process is performed so as to produce a musical tone corresponding to a key-depression event occurred in the keyboard unit 1. Herein, the waveform data corresponding to a tone-color number (i.e., a serial number assigned to each of the tone colors employed) which is designated by operating the manual-operable member 5 is read from the waveform memory 9; and then, the waveform data is supplied to the sound source circuit 6. Thus, the sound source circuit 6 produces the musical tone signal W on the basis of the performance information, representing the foregoing key-on signal KON, keycode KC and the like, which is given from the CPU 2.

In next step Sa3, a mode setting process is carried out. Herein, the mode switch (i.e., one of the manual-operable members 5) is operated by the performer so that the corresponding flags are respectively set to registers OPM and FNM. In this case, a mode flag whose value is set equal to one of decimal numbers "1" to "3" is written into the register OPM. This mode flag designates an operation mode of the sampler. When the mode flag is set at "1", a sampling process in which the waveforms of the sounds are recorded is designated. When the mode flag is equal to "2", an editing process in which the sampling waveform is processed or the file name is changed is designated. When the mode flag is equal to "3", the other processes are designated. According to the other processes, the tone color is selected or the desired tone color is searched out when performing the keyboard; or the file name is searched out.

On the other hand, a file flag is written into the register FNM. According to the file flag, it is declared whether the file name is automatically created or the file name is manually inputted. The value of the file flag is changed responsive to the setting state of the mode switch. When a manual-input mode in which the desired file name is manually inputted is selected, a decimal number "0" is set to the register FNM. When a file-name-creation mode is selected so that the file name is automatically created, a decimal number "1" or "2" is set to the register FNM. Incidentally, the details of the file-name-creation mode will be described later.

When completing the above-mentioned mode setting process, the processing of the CPU 2 proceeds to step Sa4 in which a decision branching is performed in response to the value of the mode flag set in the register OPM. When the decimal number "1" is set to the register OPM, the processing branches to step Sa5 in which the sampling process is carried out. When the decimal number "2" is set to the register OPM, the processing branches to step Sa6 in which the editing process is carried out. When the decimal number "3" is set to the register OPM, the processing branches to step Sa7 in which the other processes are carried out.

After completely performing one of the processes of steps Sa5 to Sa7 to which the processing branches, the processing of the CPU 2 returns to step Sa2 again. Thus, the above-mentioned processes of steps Sa2 to Sa7 are repeatedly performed. If the mode switch is not operated, the sampler acts like the normal electronic musical instrument. In such case, the sampler synthesizes the musical tones on the basis of the waveform data which are read out in response to the keyboard-performing operations; and consequently, those musical tones are sounded from the speaker. On the other hand, if the mode switch is operated, the process corresponding to the mode designated is carried out. Next, the details of the aforementioned editing process and sampling process will be described in turn.

(2) Routine of Sampling Process

When the processing of the CPU 2 reaches the step Sa5, a routine of sampling process is started. In this case, the processing of the CPU 2 proceeds to step Sb1 shown in FIG. 3. In step Sb1, it is judged whether or not a flag SS is set at "1". The flag SS indicates whether or not the waveform sampling operation is now proceeding. Herein, a decimal number "1" to be set as the flag SS indicates that the waveform sampling operation is proceeding, while a decimal number "0" indicates that the waveform sampling operation is not performed. Therefore, a judging process of step Sb1 is provided to judge whether or not the waveform sampling operation is now proceeding. In the present embodiment, the operations of the sampler in a waveform-sampling duration which starts after the waveform sampling operation is started are different from those of the sampler before the waveform sampling operation is started. Thus, two kinds of operations before and after the waveform sampling operation is started will be respectively described below.

(a) Operations before Starting the Waveform Sampling Operation

Figure 3:
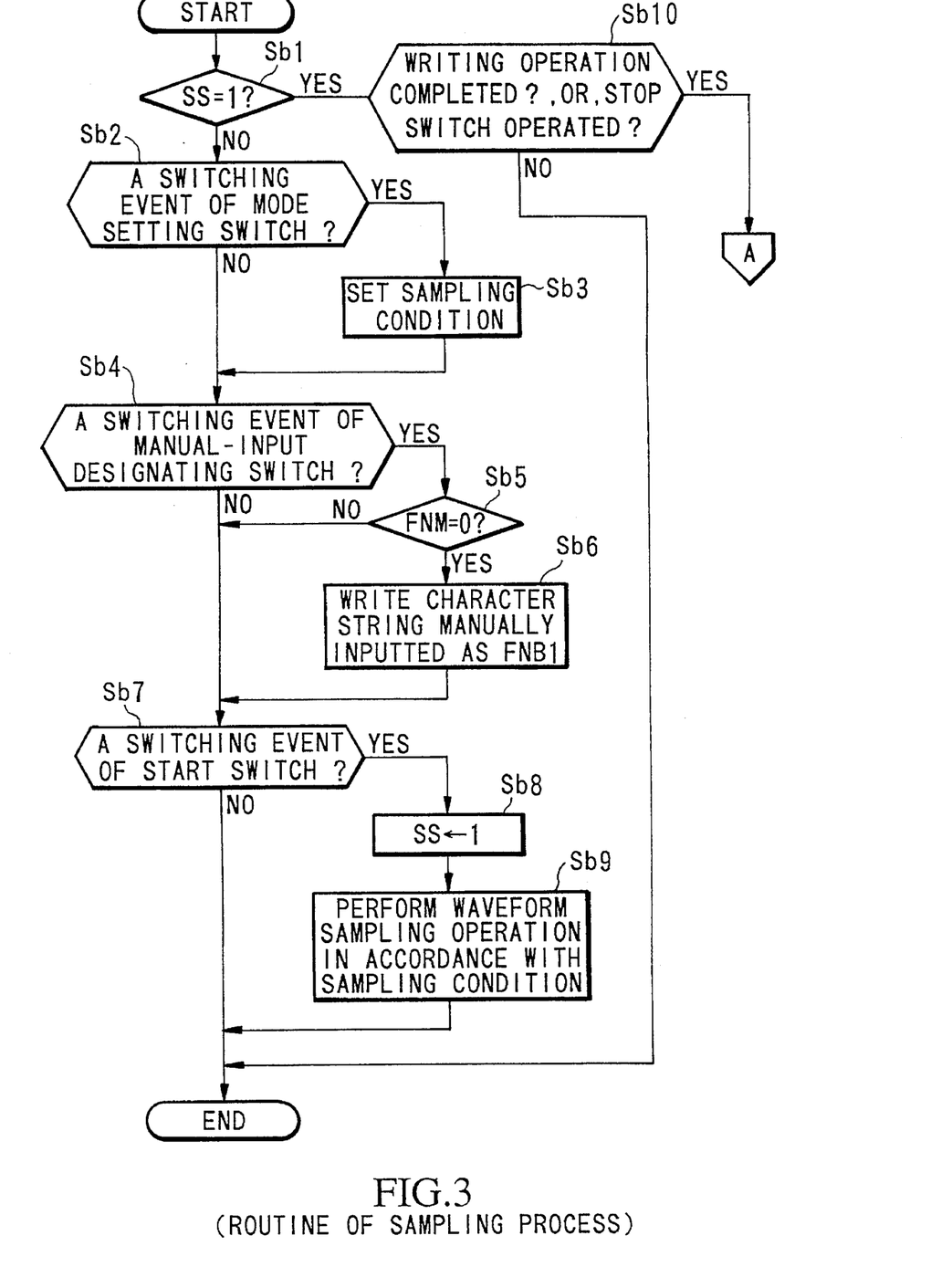
FIGS. 3 and 4 are flowcharts showing a routine of sampling process.

Before the waveform sampling operation is started, a result of the judgement performed by the process of step Sb1 is described as "NO", so that the processing of the CPU 2 proceeds to step Sb2. In step Sb2, it is judged whether or not a condition setting switch is operated. The condition setting switch is provided to designate a desired sampling condition. If switching event is detected with respect to the condition setting switch, a result of the judgement performed in step Sb2 turns to "YES". Thus, the processing proceeds to step Sb3 in which sampling rates, write-start addresses and the like are written into respective registers in accordance with the sampling condition set by the condition setting switch. If the condition setting switch is not operated, a default condition is used.

If the condition setting switch is not operated or when completing the process of step Sb3, the processing of the CPU 2 proceeds to step Sb4. In step Sb4, it is judged whether or not a switching event is occurred on a manual-input designating switch. When the manual-input designating switch is operated, a specific character string can be manually inputted into the sampler. The character string consists of five characters representing first give characters within eleven characters which form one file name. Herein, each file name consists of eight characters and other three characters representing an identifier.

Figure 5:
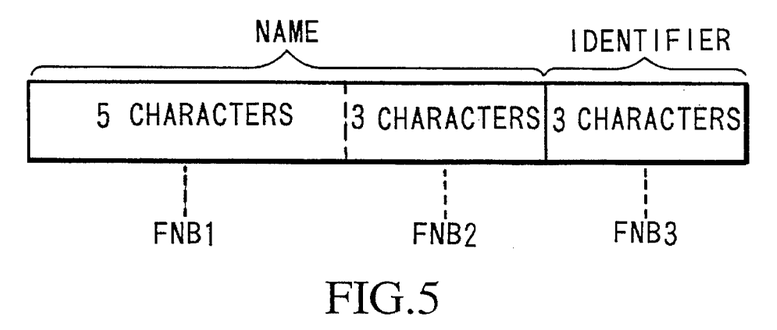
FIG. 5 shows an example of a data form used for a file name.

For example, each file name is represented by a character string whose structure is shown in FIG. 5. In FIG. 5, each file name is configured by a name portion, denoted by "NAME", consisting of eight characters and an identifier portion, denoted by "FNB3", consisting of three characters. The name portion NAME is configured by a character string FNB1, consisting of five characters, and a character string FNB2 consisting of three characters. An operation of the manual-input designating switch allows an manual input of the first five characters (i.e., character string FNB1) of the name portion NAME. On the other hand, when the aforementioned file-name creation mode is designated, the predetermined character strings representing the property of the sampling waveform are automatically created as the character strings FNB1 and FNB2 which form the name portion NAME.

When the manual-input designating switch is operated so that its switching event is occurred, a result of the judgement in step Sb4 turns to "YES"; and consequently, the processing proceeds to step Sb5. In step Sb5, it is judged whether or not a value of the aforementioned register FNM is set at "0", in other words, it is judged whether or not the manual-input mode is designated. If the manual-input mode is designated, a result of the judgement in step Sb5 turns to "YES", so that the processing proceeds to step Sb6. In step Sb6, the character string FNB1 manually inputted is written into a register RFNB1.

In contrast, when the manual-input designating switch is not operated, or when the manual-input mode is not set, or when completing the process of step Sb6, the processing proceeds to step Sb7. In step Sb7, it is judged whether or not a start switch, designating a sampling start timing, is operated. When the start switch is operated, a result of the judgement in step Sb7 turns to "YES", so that the processing proceeds to step Sb8. In step Sb8, the flag SS is set at "1" so as to declare that the waveform sampling operation is started.

In next step Sb9, the operations of the aforementioned waveform sampling portion (provided in the sound source circuit 6) are regulated In accordance with the sampling condition which is set by the process or step Sb3, so that the waveform sampling operation is carried out in accordance with the sampling condition. Incidentally, if the start switch is not operated, the CPU 2 terminates the routine of sampling process, so that the processing thereof returns back to the main routine. As described heretofore, the processes are performed in response to the operations of the condition setting switch and manual-input designating switch before starting the waveform sampling operation.

(b) Operations after Starting the Waveform Sampling Operation

When the start switch is operated so that the processing of the CPU 2 reaches step Sb9 through step Sb8 shown in FIG. 3, the waveform sampling operation is carried out. In this case, the result of the judgement in step Sb1 turns to "YES", resulting that the processing branches to step Sb10. In step Sb10, it is judged whether or not the waveform sampling portion provided in the sound source circuit 6 completes the writing operation of the waveform data, or it is judged whether or not the stop switch is operated. If the current situation satisfies each of those conditions, the result of the judgement in step Sb10 turns to "YES" so that the processing proceeds to step Sb11 shown in FIG. 4. If not, the routine of sampling process is terminated, so that the processing returns back to the main routine (see FIG. 2).

Figure 4:
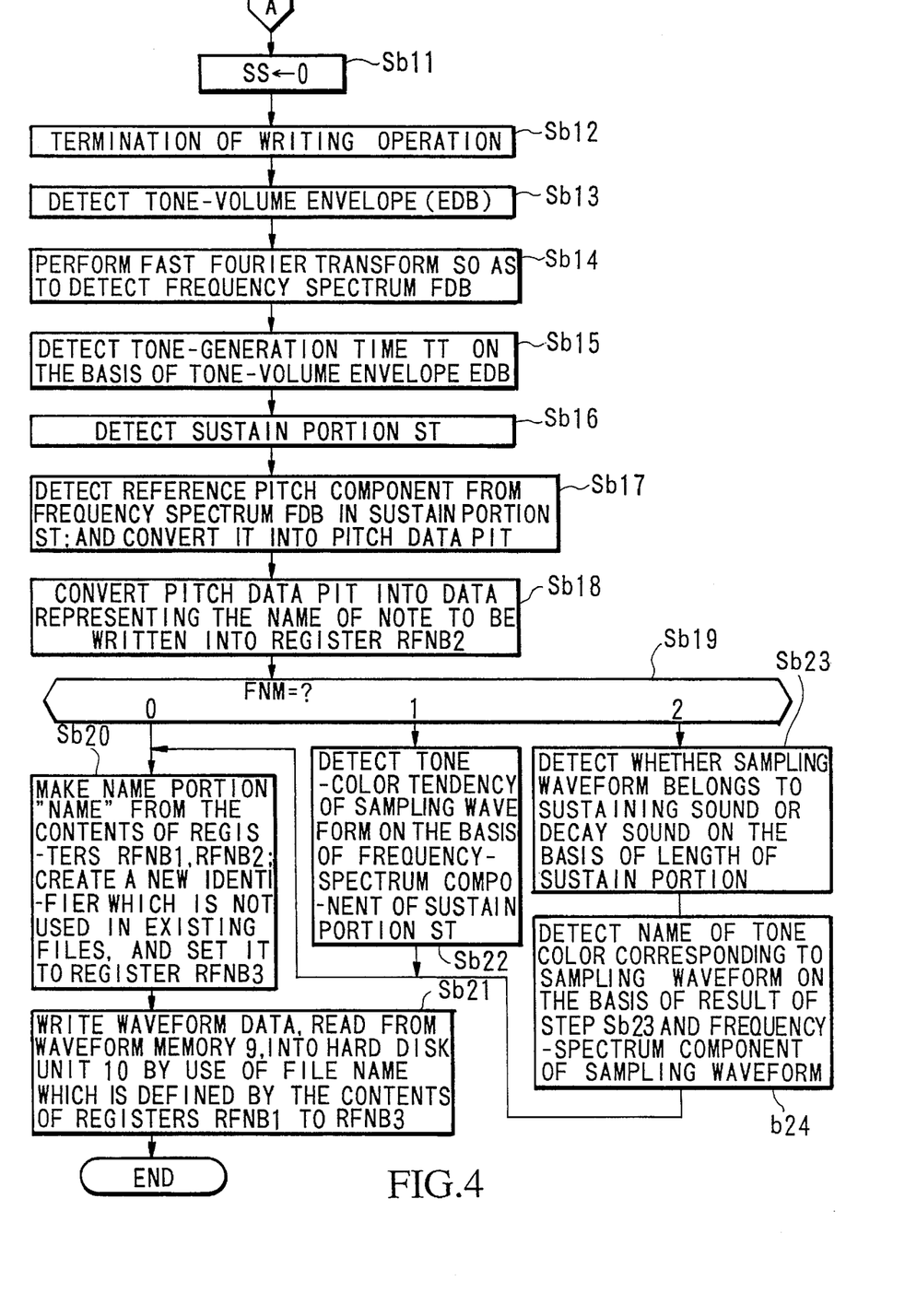

When a switching event is occurred on the stop switch, the processing of the CPU 2 proceeds to step Sb11, wherein the CPU 2 sets the flag SS at "0". Thus, the waveform sampling portion of the sound source circuit 6 acknowledges that the waveform sampling operation is completely performed. Incidentally, if the waveform sampling operations are carried out in a certain period of time so that there remain no areas of the waveform memory 9 in which the sampling data can be written, the waveform sampling portion produces a signal, representing a completion of the writing operation, and sends it to the CPU 2. Upon the receipt of that signal, the CPU 2 sets the flag SS at "0". In next step Sb12, the CPU 2 sends a command, representing a termination of the writing operation, to the waveform sampling portion in the sound source circuit 6. Then, the processing proceeds to step Sb13.

In step Sb13, the waveform data corresponding to one sampling period are read from the waveform memory 9, so that the CPU 2 detects a tone-volume envelope EDB whose level corresponds to an envelope level of the waveform represented by the read waveform data. In next step Sb14, the CPU 2 performs a fast Fourier transform on the waveform data so as to detect a frequency spectrum FDB. In step Sb15, the CPU 2 detects a tone-generation time TT, representing a period of time between a start timing of the tone generation and an end timing of the tone generation, on the basis of the tone-volume envelope EDB which has been detected by the CPU 2 in step Sb13. In step Sb16, the CPU 2 extracts a frequency range, in which a power spectrum is maintained constant, from the frequency spectrum FDB. This frequency range is used as a frequency range of a sustain portion ST in the waveform envelope.

In step Sb17, the CPU 2 detects a reference pitch component from the frequency spectrum FDB in the sustain portion ST; and then, the reference pitch component is converted into pitch data PIT. In step Sb18, a name of the note whose frequency is the closest to the frequency represented by the pitch data PIT is read from a look-up table stored in the ROM 3; and then, a character string (e.g., "C3", "B", etc.) representing the name of the note is written into a register RFNB2. Incidentally, the contents of the register RFNB2 correspond to the aforementioned character string FNB2.

In step Sb19, a registration file name is created in response to the file flag which is set in the register FNM. Hereinafter, the operation of the system will be described with respect to each of flag values.

① First Case Where the File Flag is Set at "0"

In this case, the manual-input mode is selected because the file flag is set at "0". Therefore, the processing of the CPU 2 proceeds to step Sb20. In step Sb20, the name portion NAME in the data of file name (see FIG. 5) is formed on the basis of the written contents of the registers RFNB1 and RFNB2. In this case, the first five characters are written into the register RFNB1 by the user, while the character string representing the name of the note corresponding to the sampling waveform is written into the register RFNB2. Therefore, by combining those contents of the registers RFNB1 and RFNB2, it is possible to form the name portion NAME (see FIG. 5) in the file name.

In step Sb20, the file name which is identical to the name portion NAME is searched out from existing files which are registered in the hard disk unit 10. If such file name is found, a new identifier which has not been used yet is set to the register RFNB3. For example, when the file name which is identical to the name portion NAME is existed in the file names registered in the hard disk unit 10 while serial numbers such as "001", "002", . . . are used as the existing identifiers, the serial number of the last existing identifier is incremented so as to create a new identifier to be set to the register RFNB3. In contrast, if no file whose filename is identical to the name portion NAME is existed in the hard disk unit 10, an initial number "001" is used as the identifier to be set to the register RFNB3.

As described above, the file name is defined by the name portion NAME and identifier. Then, the processing of the CPU 2 proceeds to step Sb21. In step Sb21, the waveform data which are read from the waveform memory 9 are stored in the hard disk unit 10 by use of the file name which is defined by the contents of the registers RFNB1 to RFNB3.

② Second Case Where File Flag is Set at "1"

In this case, the processing proceeds to step Sb22 in which a tone-color tendency for the sampling waveform is detected on the basis of spectrum components of the sustain portion ST. The tone-color tendency represents a characteristic of the tone color represented by the waveform. This tone-color tendency is expressed by an adjective. For example, an adjective "bright" is used for the tone color having a bright-state characteristic; an adjective "mellow" is used for the tone color having a soft-state characteristic; and an adjective "light" is used for the tone color having a light-state characteristic. In order to detect the above-mentioned tone-color tendency, examples of reference waveforms each representing each tone-color tendency are stored in the ROM 3 in advance as pattern data. Thus, by performing a pattern matching operation between the pattern data and the spectrum component of the sampling waveform, it is possible to detect the tone-color tendency.

In step Sb22, data representing the tone-color tendency detected is set to the register RFNB1. Thereafter, the aforementioned processes if steps Sb20 and Sb21 are carried out, so that the registration file name is automatically created. In the registration file name, the first five characters represent the tone-color tendency of the sampling waveform, while continuing three characters represent the name of the note corresponding to the sampling waveform. If the name portion NAME consisting of eight characters representing the tone-color tendency and the name of note overlaps with that of the existing file name which has been already registered in the hard disk unit 10, the serial number of the identifier applied to the existing file name is incremented to create a new identifier; and then, the new identifier created is applied to the name portion NAME.

③ Third Case Where the File Flag is Set at "2"

In this case, the processing proceeds to step Sb23 in which it is judged whether the sampling waveform corresponds to a sustaining sound or a decay sound. This judgement is performed on the basis of a length of the sustain portion ST. If the sustain portion ST in the waveform envelope is sustained for a predetermined period of time or more, the sound corresponding to that waveform is assumed as the sustaining sound. If not, the sound is assumed as the decay sound. In next step Sb24, the CPU 2 detects the tone color corresponding to the waveform under the consideration of a result of the judgement performed in step Sb23 and frequency-spectrum components contained in the waveform. Then, the tone color detected is written into the register RFNB1.

In order to detect the tone color, the ROM 3 stores examples of the waveforms which correspond to the tone colors unique to the musical instruments such as the piano, violin and flute. Then, the tone color is detected on the basis of a degree of relativity between the frequency-spectrum components of the sampling waveform and each of the waveforms which are stored in the ROM 3 in advance. After detecting the tone color, the CPU 2 performs the aforementioned processes of steps Sb20 and Sb21 respectively so as to automatically create the registration file name. In that registration file name, the first five characters represent the name of the tone color corresponding to the sampling waveform, while continuing three characters represent the name of the note corresponding to the sampling waveform. As described before, the name portion NAME consisting of the tone-color tendency and the name of note is given a new identifier.

In the routine of sampling process as described heretofore, the sampler automatically creates the file name which consists of the tone-color tendency and the name of note with respect to the sampling waveform or which consists of the name of tone color and the name of note with respect to the sampling waveform. In short, the sampler can automatically create the file name which represents the property of the sampling waveform. Moreover, if the file name automatically created becomes identical to the existing file name, a new identifier is automatically produced and is applied to the file name. According to the routine of sampling process, even if the user manually enters the file name, a string of characters representing the name of note corresponding to the sampling waveform is automatically created and is added to the characters which are manually entered by the user. In this case, if the file name, some characters of which are manually entered by the user and the other characters of which are automatically created, coincides with the existing file name, a new identifier which is not used in the hard disk unit 10 is automatically created and is applied to the file name.

(3) Routine of Editing Process

Figure 6:
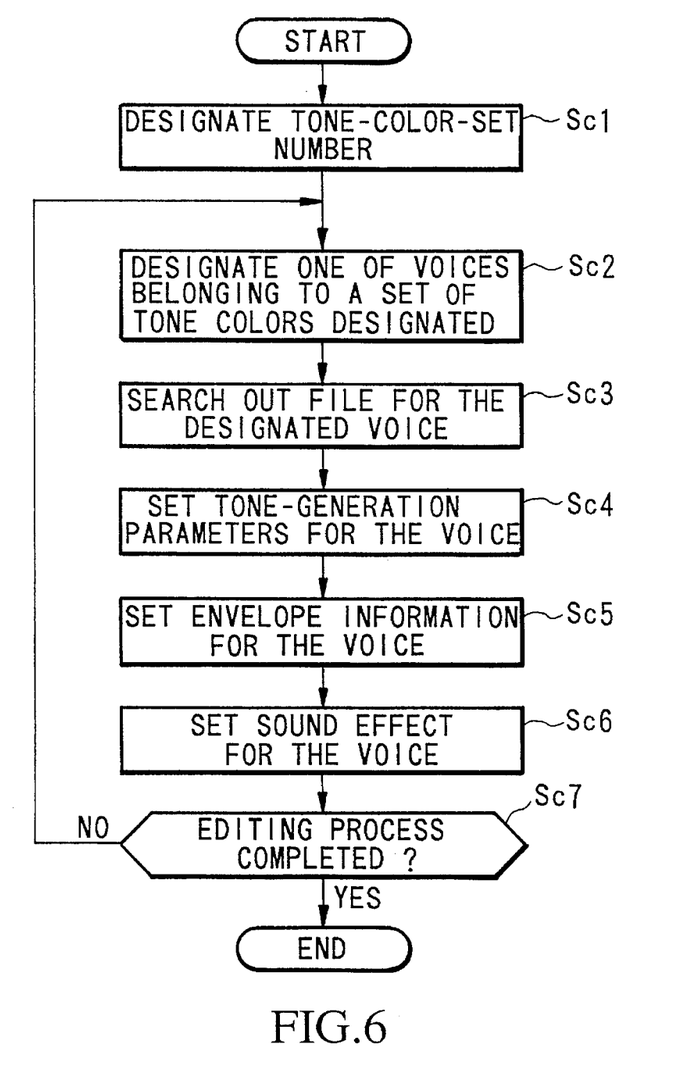
FIG. 6 is a flowchart showing a routine of editing process.

Next, operations of the routine of editing process which is provided to edit the tone color data will be described in detail. Herein, the tone color data denotes information which determines the tone color for the musical tone signal W. This information represents the kind of the waveform data to be used for synthesizing the musical tones and also represents its envelope waveform. Now, when the processing of the CPU 2 proceeds to step Sa6 in the main routine (see FIG. 2), the routine of editing process, the detailed contents of which are shown in FIG. 6, is started. At first, a process of step Sc1 is carried out.

In step Sc1, the CPU 2 designates a tone-color-set number corresponding to a set of tone colors to be edited. The above-mentioned tone-color-set number designates waveform information which is determined with respect to each of the tone areas, while the waveform information contains a plurality of voices represented by the waveform data. In step Sc2, the CPU 2 designates one of the voices which correspond to a set of tone colors corresponding to the designated tone-color-set number. In step Sc3, the CPU 2 searches the files registered in the hard disk unit 10 so as to find out the file corresponding to the designated voice; and then, the CPU 2 sets a certain file name for that file. Then, the waveform data are read from the file and are stored in the predetermined area of the RAM 4.

In step Sc4, the CPU 2 changes tone-generation parameters used for the designated voice (i.e., waveform data to be edited). As the tone-generation parameters, the CPU 2 newly defines the tone area to which the voice is assigned, the key-depression intensity and the like. For example, if the voice is registered in the hard disk unit 10 by use of the file name which is represented by characters "C3 BRIGHT" under the operation of the aforementioned sampling process, the tone area of the voice is changed to another tone area existing between musical notes A2 and D3, while the velocity representing the key-depression intensity is changed to belong to a range of the velocity whose value is equal to or above "70".

In step Sc5, the CPU 2 newly sets the envelope information for the waveform data whose tone-generation frequency range is changed. Herein, the envelope information represents an attack rate, a decay level and the like which are required to fix the envelope waveform. In step Sc6, the CPU 2 sets a sound effect, such as the vibrato and de-tune, to be imparted to the voice (i.e., waveform data). Thereafter, the processing proceeds to step Sc7.

In step Sc7, the CPU 2 judges whether or not the editing process is completely performed for the designated set of tone colors. If the editing process is completely performed with respect to all of the voices belonging to the designated set of tone colors, a result of the judgement in step Sc7 turns to "YES", so that the processing escapes from the routine of editing process and returns back Go the foregoing main routine. If not, the processing of the CPU 2 returns to step Sc2 from step Sc7, so that the aforementioned processes of steps Sc2 to Sc7 are repeatedly performed. According to the routine of editing process as described heretofore, the registration file name created for each of the sampling waveforms to be edited represents the contents (or property) of the waveform, so that an attribute of the voice can be easily grasped. Thus, the editing operation can be performed quite easily.

[C] Modified Examples

As described heretofore, the present embodiment can automatically create the file name representing the property of the sampling waveform, wherein the file name consists of the tone-color tendency and the name of note with respect to the sampling waveform, or the file name consists of the tone color and the name of note with respect to the sampling waveform. By use of the file name, the waveform data are registered in the hard disk unit 10. In the registration of the waveform, if the file name automatically created coincides with the existing file name, a new identifier which enables a distinction from the existing file name is automatically created and is imparted to the file name. The conventional art requires manual operations to input the file name or registration number when registering the waveform into the hard disk unit. However, the present invention does not require those manual operations. Further, the conventional art sometimes destroys the waveform data by overwriting the new file on the existing file. In that case, there is a possibility in that the desired file cannot be searched out. However, the present invention does not suffer from those drawbacks.

Figure 7:
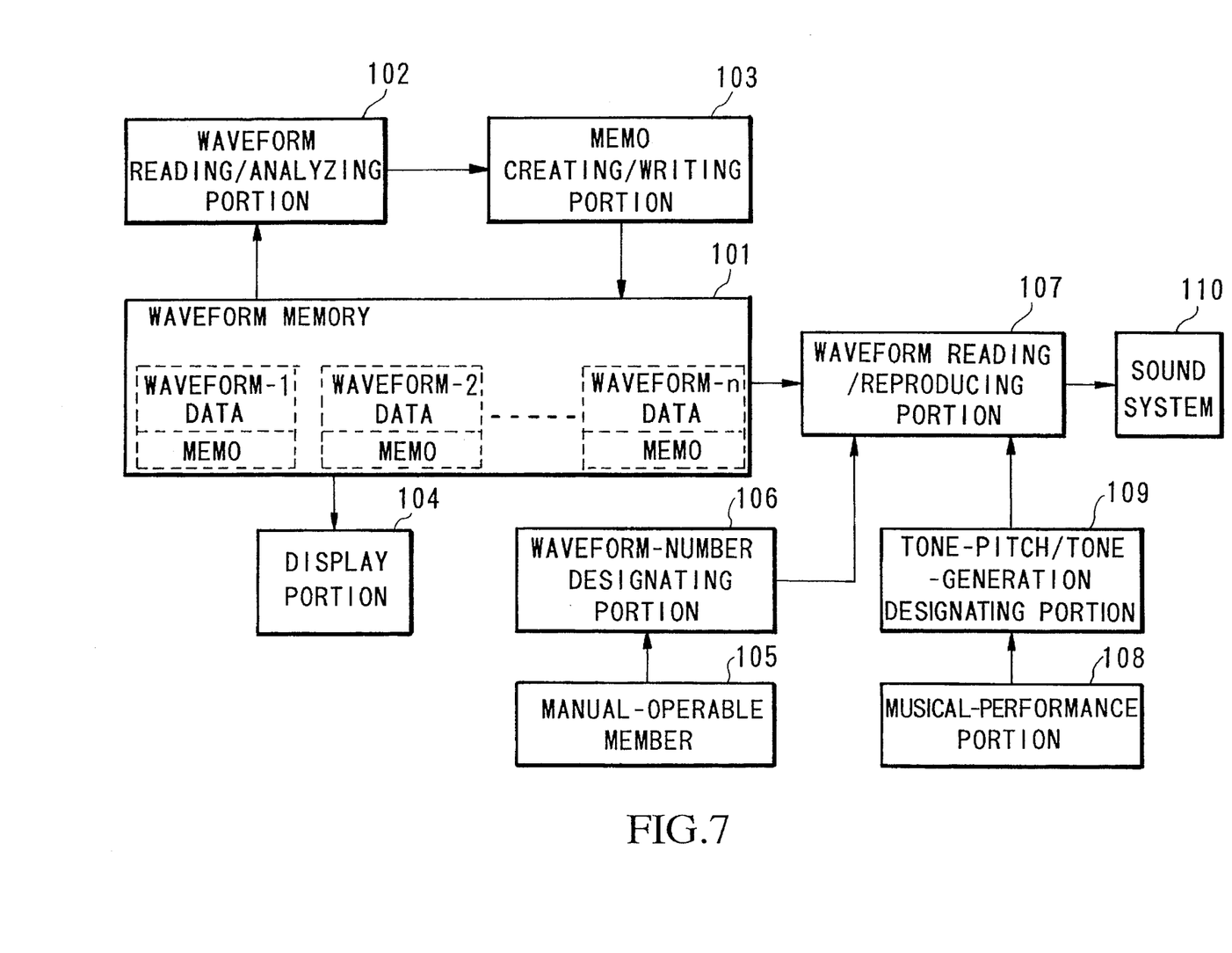
FIGS. 7 and 8 are block diagrams respectively showing modified examples of the electronic musical instrument according to the present invention.

In the present embodiment, the property of the sampling waveform is extracted, so that the file name is made by use of the string of characters representing the property of the sampling waveform. Instead, the character string can be used as the name of the sampling waveform or the character string can be used as a memo which is applied to the sampling waveform. In order to use the character string as the memo, the electronic musical instrument can be re-designed as shown in FIG. 7. In FIG. 7, a plurality of sampling waveforms whose number is denoted by "n" are stored in a waveform memory 101 in advance. Those sampling waveforms are given waveform numbers respectively, so that they are respectively designated by terms "waveform-1", "waveform-2", . . . , "waveform-n". Each of the sampling waveforms stored in the waveform memory 101 is read out and analyzed by a waveform reading/analyzing portion 102. On the basis of a result of the analysis made by the waveform reading/analyzing portion 102, a memo creating/writing portion 103 creates plural pieces of information representing a distinction between the sustaining sound and decay sound, a peak level of the attack portion and a level of the sustain portion as well as the name of tone color, the tone-generation time TT, the pitch PIT and the tone-color tendency. Those pieces of information are written into a memo storage area as memo data. The memo storage area is provided in the waveform memory 101 for each of the waveform data. The contents of the memo data together with the waveform number are visually displayed by a display portion 104. By use of the visual display, the performer selects one of the waveforms, in other words, the performer designates a desired waveform number by operating a manual-operable member 105. Responding to the manual operation applied to the manual-operable member 105, a waveform-number designating portion 106 designates the waveform number corresponding to the certain waveform data. Then, a reproducing operation to be set by a waveform reading/reproducing portion 107 is stood by for the waveform data. Now, the performer performs a musical-performance portion 108 (e.g., keyboard) so that a tone pitch/tone-generation designating portion 109 designates the tone pitch and the tone-generation timing for the musical tone to be generated. At this time, the waveform data is read out by the waveform reading/reproducing portion 107 at a velocity corresponding to the tone pitch designated by the tone-pitch/tone-generation designating portion 109; and consequently, a sound system 110 generates the musical tone on the basis of the read waveform data.

By use of a waveform name and the memo data which are applied to each of the waveform data, it is possible to construct a data base which can manage aplenty of waveform data. In this case, all pieces of information which are stored as the memo data can be treated as one item. However, the contents of the memo data can be divided into plural items. For example, the information representing the waveform name is treated as one item, while the information representing the tone-color tendency is treated as another item.

As the adjective term representing the tone-color tendency, there are provided "sharp", "dull", "clear", "unclear", "thin", "thick", "pure", "impure", "far", "close", "wide", "narrow" and the like other than "bright", "dark", "light" and "heavy". The above-mentioned adjective terms can be also added with an adverb such as "very" and "slightly" which express a degree of the tendency. Other than the adverb, it is possible to add a numeric term to the adjective term.

Figure 8:
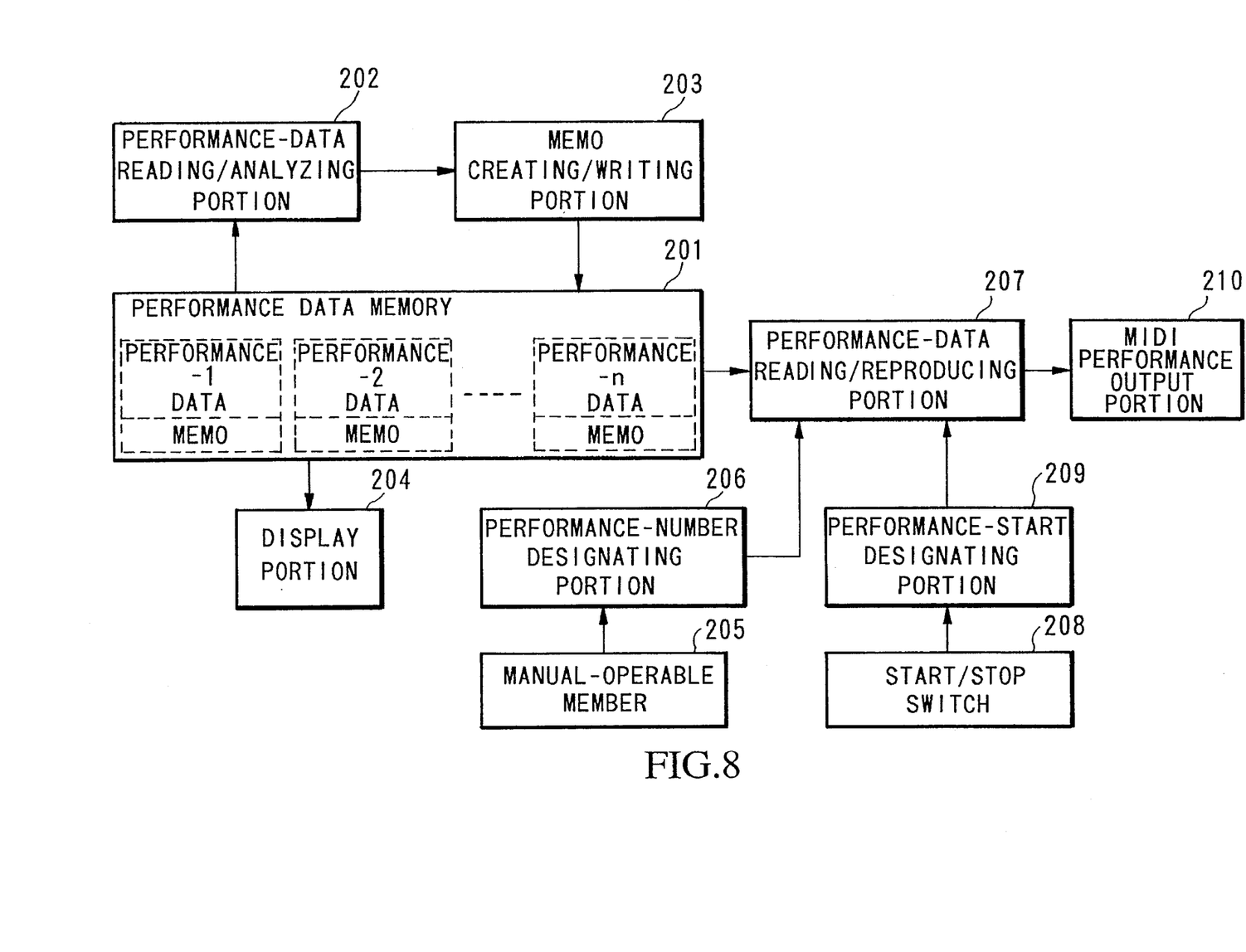

Moreover, the present invention can be used for another technique other than the technique in which the name of the waveform data is automatically created. For example, the present system can automatically create the name of the tone color data, or the present system can automatically create the names of tune data and rhythm data which are used in a sequencer. In order to apply the character string automatically created to the tune data, the electronic musical instrument can be re-designed as shown in FIG. 8. In FIG. 8, a performance data memory 201 stores a plurality of performance data (representing musical performance), the number of which is denoted as "n", in advance. Those performance data are given performance numbers respectively, so that they are respectively designated by terms "performance-1", "performance-2", . . . , "performance-n". The performance data stored in the performance data memory 201 is read out and analyzed by a performance-data reading/analyzing portion 202. On the basis of a result of the analysis made by the performance-data reading/analyzing portion 202, a memo creating/writing portion 203 creates performance parameters representing a performance time, a name of performance style, a name of music genre, a number of parts, an attribute, a speed of performance and a tendency of tune which is represented by terms such as the brightness, lightness, sharpness. Those performance parameters are stored as the memo data in a memo area which is provided for each of the performance data. The contents of the memo data together with its performance number are visually displayed by a display portion 204. By referring to a visual display, the performer can select the desired performance data by designating the performance number by operating a manual-operable member 205. When operating the manual-operable member 205, the performance number is designated under an operation of a performance number designating portion 206. Then, a reproducing operation to be set by a performance-data reading/reproducing portion 207 is stood by for the performance data corresponding to the performance number designated. When a performance start timing is designated by a performance-start designating portion 209 in response to a switching operation of a start/stop switch 208, the performance data corresponding to the performance number designated is read from the performance data memory 201 by the performance-data reading/reproducing portion 207. Thereafter, the performance data reproduced is converted into MIDI data, having a data form based on Musical Instrument Digital Interface standard, by a MIDI performance output portion 210. Thus, the MIDI data is outputted from the MIDI performance output portion 210.

Incidentally, the character string to be automatically created can be used as the file name other than the memo data.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. An electronic musical instrument comprising:

a storage means for storing musical tone information which is provided to produce a musical tone having a musical property;

an analyzing means for analyzing said musical tone information so as to determine its musical property;

a character creating means for automatically creating a string of characters representative of said musical property of said musical tone information, said string of characters being added to said musical tone information; and a display means for visually displaying at least a portion of said string of characters in connection with said musical tone information, wherein said portion of said string of characters comprises alphanumeric characters having a specific meaning describing the musical property in a human language, wherein the human language has a set of spoken and written words and the string of characters includes at least one of said words.

2. An electronic musical instrument as defined in claim 1 wherein said storage means is a waveform memory made of a random-access memory.

3. An electronic musical instrument as defined in claim 1 further providing a hard disk unit in which a plurality of musical tone information are registered as files, so that said string of characters are used as a part of a file name which is used when registering the file into said hard disk unit.

4. An electronic musical instrument as defined in claim 3 wherein said file name contains an identifier made of one or more characters.

5. An electronic musical instrument as defined in claim 4 further comprising identifier creating means for automatically creating a new identifier, which is not used in the files registered in said hard disk unit, when the file name automatically created coincides with an existing file name which has been already used by the file registered in said hard disk unit, said new identifier being incorporated into the file name corresponding to the file to be newly registered in said hard disk unit.

6. An electronic musical instrument as defined in claim 3 wherein:
   said musical properties determined by said analyzing means includes a tone color tendency of the musical tone; and
   said string of characters used as part of said file name is based on said tone color tendency.

7. An electronic musical instrument as defined in claim 1 further comprising an external storage means which is capable of storing the musical tone information, wherein the string of characters are used as at least a part of a file name for the musical tone information stored in the external storage means.

8. An electronic musical instrument as defined in claim 7 wherein the file name is automatically created every time sampling of waveform is completed.

9. An electronic musical instrument as defined in claim 7 wherein a first string of characters, which are manually inputted, and a second string of characters, which are automatically created, are combined together to form the file name.

10. An electronic musical instrument as defined in claim 7 wherein plural sets of characters, each set of which is automatically created, are combined together to form the file name.

11. An electronic musical instrument comprising:
    a waveform memory for storing a plurality of sampling waveforms having musical properties;
    an analyzing means for analyzing musical properties of at least one of said sampling waveforms; and
    a character creating means for automatically creating a string of characters describing said musical properties determined by said analyzing means for each respective one of said at least one sampling waveforms, wherein the string of characters comprise characters having a specific meaning describing the musical property in a human language, wherein the human language has a set of spoken and written words and the string of characters includes at least one of said words.

12. An electronic musical instrument as defined in claim 11 further comprising a display means for visually displaying said string of characters, wherein the string of characters describes the musical properties of one of said sampling waveforms.

13. An electronic musical instrument as defined in claim 11 further comprising an external storage means which is capable of storing the plurality of sampling waveforms, wherein the string of characters are used as at least a part of a file name for at least one of the plurality of sampling waveforms stored in the external storage means.

14. An electronic musical instrument as defined in claim 13 wherein the file name is automatically created every time sampling of waveform is completed.

15. An electronic musical instrument as defined in claim 13 wherein a first string of characters, which are manually inputted, and a second string of characters, which are automatically created, are combined together to form the file name.

16. An electronic musical instrument as defined in claim 13 wherein plural sets of characters, each set of which is automatically created, are combined together to form the file name.

17. An electronic musical instrument comprising:
    a waveform memory for storing a plurality of sampling waveforms;
    a waveform analysis circuit for analyzing musical properties of at least one of said sampling waveforms;
    a memo storage memory;
    a memo creating circuit for creating plural pieces of information representative of the musical properties of at least one of said plurality of sampling waveforms based on analysis performed by said waveform analysis circuit and for storing said information in said memo storage memory; and
    a display means for visually displaying said plural pieces of information, wherein the plural pieces of information comprise alphanumeric characters having a specific meaning as human language describing the musical properties, wherein the human language has a set of spoken and written words and the string of characters includes at least one of said words.

18. An electronic musical instrument as defined in claim 17 further comprising at least one manually operable member for selecting a desired waveform based on the plural pieces of information displayed on said display means.

19. An electronic musical instrument as defined in claim 17 wherein each of said sampling waveforms is identified by an identifier and further comprising a database memory in which said identifiers are stored and each of said identifiers is mapped to the respective plural pieces of information describing the respective sampling waveform.

20. An electronic musical instrument comprising:
    a performance data memory for storing performance data for a plurality of performances;
    a memo storage memory;
    a performance data analysis circuit for identifying musical properties of at least one of said performances; and
    a word creating circuit for creating descriptive words characterizing the musical properties of the respective performance identified in the performance data analysis circuit and for storing said descriptive words in said memo storage memory, wherein the descriptive words have a specific meaning describing the musical properties in a human language, wherein the human language has a set of spoken and written words and the string of characters includes at least one of said words.

21. An electronic musical instrument as defined in claim 20 wherein each of said performances is identified by an identifier and further comprising a display means for displaying at least one of said identifiers along with memo data corresponding to the performance identified by the respective identifier.

* * * * *